United States Patent
Ye et al.

(10) Patent No.: US 11,887,388 B2
(45) Date of Patent: Jan. 30, 2024

(54) OBJECT POSE OBTAINING METHOD, AND ELECTRONIC DEVICE

(71) Applicant: BEIJING BAIDU NETCOM SCIENCE AND TECHNOLOGY CO., LTD., Beijing (CN)

(72) Inventors: Xiaoqing Ye, Beijing (CN); Zhikang Zou, Beijing (CN); Xiao Tan, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 467 days.

(21) Appl. No.: 17/346,835

(22) Filed: Jun. 14, 2021

(65) Prior Publication Data

US 2021/0304438 A1 Sep. 30, 2021

(30) Foreign Application Priority Data

Sep. 25, 2020 (CN) .......................... 202011025396.7

(51) Int. Cl.
*G06T 7/73* (2017.01)
*G06V 20/64* (2022.01)
(Continued)

(52) U.S. Cl.
CPC ............. *G06V 20/647* (2022.01); *G06N 3/08* (2013.01); *G06T 7/75* (2017.01); *G06V 10/82* (2022.01);
(Continued)

(58) Field of Classification Search
CPC .... G06V 20/647; G06V 10/82; G06V 10/462; G06V 10/25; G06N 3/08; G06N 3/045; G06T 7/75; G06T 2200/08; G06T 2207/20081; G06T 2207/30244; G06T 2210/04; G06T 2207/20084; G06T 2207/10028; G06T 7/77; G06T 7/73; G06T 7/223; G06T 2207/10004
(Continued)

(56) References Cited

U.S. PATENT DOCUMENTS

| 8,437,502 B1 * | 5/2013 | Siddiqui ................... G06T 7/73 |
| | | 382/199 |
| 2021/0397871 A1 * | 12/2021 | Deng ................... H04N 23/675 |

FOREIGN PATENT DOCUMENTS

CN 110390137 * 12/2020 ............. G06F 18/22

* cited by examiner

*Primary Examiner* — Jerome Grant, II
(74) *Attorney, Agent, or Firm* — Osha Bergman Watanabe & Burton LLP

(57) ABSTRACT

The present disclosure provides an object pose obtaining method, and an electronic device, relates to technology fields of image processing, computer vision, and deep learning. A detailed implementation is: extracting an image block of an object from an image, and generating a local coordinate system corresponding to the image block; obtaining 2D projection key points in an image coordinate system corresponding to a plurality of 3D key points on a 3D model of the object; converting the 2D projection key points into the local coordinate system to generate corresponding 2D prediction key points; obtaining direction vectors between each pixel point in the image block and each 2D prediction key point, and obtaining a 2D target key point corresponding to each 2D predication key point based on the direction vectors; and determining a pose of the object according to the 3D key points and the 2D target key points.

20 Claims, 5 Drawing Sheets

(51) Int. Cl.
  *G06N 3/08* (2023.01)
  *G06V 10/82* (2022.01)
  *G06V 10/46* (2022.01)
(52) U.S. Cl.
  CPC .............................. *G06T 2200/08* (2013.01);
      *G06T 2207/20081* (2013.01); *G06T 2207/30244* (2013.01); *G06T 2210/04* (2013.01); *G06V 10/462* (2022.01)
(58) Field of Classification Search
  USPC ........................................................ 382/285
  See application file for complete search history.

OBJECT POSE OBTAINING METHOD, AND ELECTRONIC DEVICE

CROSS-REFERENCE TO RELATED APPLICATION

This application claims priority to and benefits of Chinese Patent Application Serial No. 202011025396.7, filed with the State Intellectual Property Office of P. R. China on Sep. 25, 2020, the entire content of which is incorporated herein by reference.

FIELD

The present disclosure relates to technology fields of image processing, computer vision, and deep learning in the computer technology field, and more particularly to an object pose obtaining method, an electronic device, and a storage medium.

BACKGROUND

At present, the object pose obtaining method has been widely used in the fields of robot grasping, industrial production automation, architectural design, etc. For example, the object pose obtaining method can be used to determine the position and direction of the object, so that the grasping strategy of the robot can be obtained, which allows the robot to accurately grasp the object. Alternatively, the object pose obtaining method can also be used to determine the position and direction of the furniture in the house, which is convenient for architects to plan the architectural design of the house.

SUMMARY

The present disclosure provides an object pose obtaining method, an electronic device, and a storage medium.

An object pose obtaining method is provided. The method includes: extracting an image block of an object from an image, and generating a local coordinate system corresponding to the image block; obtaining 2D projection key points in an image coordinate system corresponding to a plurality of 3D key points on a 3D model of the object; converting the 2D projection key points into the local coordinate system to generate corresponding 2D prediction key points; obtaining direction vectors between each pixel point in the image block and each 2D prediction key point, and obtaining a 2D target key point corresponding to each 2D predication key point based on the direction vectors; and determining a pose of the object according to the 3D key points and the 2D target key points.

An electronic device is provided. The electronic device includes at least one processor and a memory communicatively couple to the at least one processor. The memory has instructions executable by the at least one processor stored thereon that, when executed by the at least one processor, cause the at least one processor to perform the object pose obtaining method according to the first aspect of the present disclosure.

A non-transitory computer-readable storage medium storing computer instructions is provided. The computer instructions are configured to cause a computer to perform the object pose obtaining method according to the first aspect of the present disclosure.

It is to be understood that the content described in this section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are for better understanding of the present disclosure and do not constitute a limitation to the present disclosure, in which.

DETAILED DESCRIPTION

The exemplary embodiments of the present disclosure are described below with reference to the accompanying drawings, which include various details of the embodiments of the present disclosure to facilitate understanding, and should be regarded as merely exemplary. Therefore, those skilled in the art should appreciate that various changes and modifications can be made to the embodiments described herein without departing from the scope and spirit of the present disclosure. Likewise, for clarity and conciseness, descriptions of well-known functions and structures are omitted in the following description.

Figure 1:
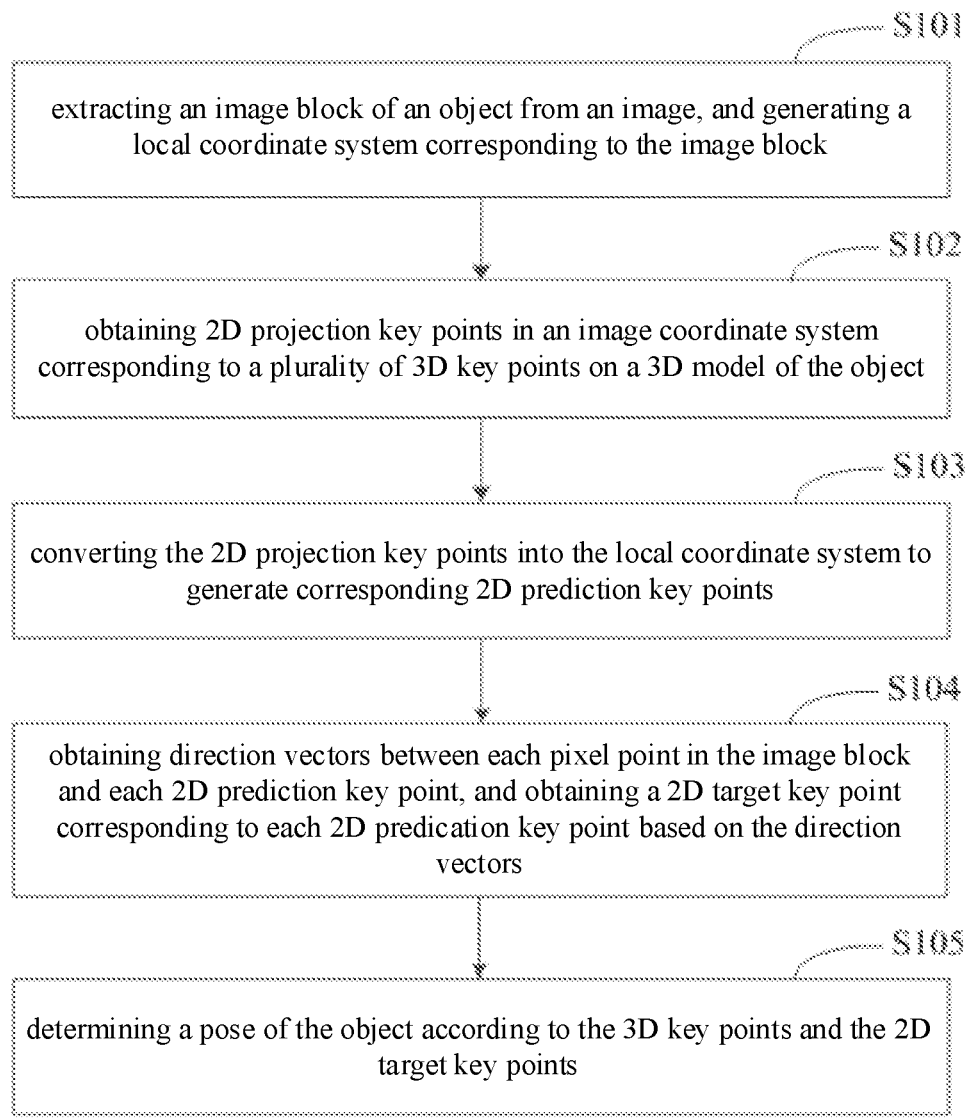
FIG. 1 is a flow chart of an object pose obtaining method according to an embodiment of the present disclosure.

FIG. 1 is a flow chart of an object pose obtaining method according to an embodiment of the present disclosure.

As illustrated in FIG. 1, the object pose obtaining method according to an embodiment of the present disclosure includes the following.

At block S101, an image block of an object is extracted from an image, and a local coordinate system corresponding to the image block is generated.

It may be noted that, an execution subject of the object pose obtaining method according to embodiments of the present disclosure may be a hardware device with data and information processing capability and/or the software necessary for driving the work of the hardware device. Alternatively, the execution subject may include a workstation, a server, a computer, a user terminal and other devices. Among them, the user terminal includes but is not limited to a mobile phone, a computer, a smart home appliance, an on-board terminal, etc.

In some embodiments of the present disclosure, a camera may be used to photograph an object to obtain an image including an image block of the object, and then the image block of the object may be extracted from the image, and an image local coordinate system (i.e., the local coordinate system) corresponding to the image block may be generated.

It is understandable that, compared to the solution of using the original image to obtain the pose of the object in the related art, the image block of the object may be used to obtain the pose of the object in the present disclosure. The image block may include an occluded area of the object. In the process of acquiring the pose, influence factors such as light intensity and position occlusion can be considered, so that the robustness of the pose estimation is improved.

In some embodiments of the present disclosure, the image is an image coordinate system. The origin of the image coordinate system may be the pixel point in the upper left corner of the image. After the image block of the object is extracted from the image, the image local coordinate system corresponding to the image block may also be generated. The origin of the image local coordinate may be any point on the image block.

Alternatively, generating the image local coordinate system corresponding to the image block may includes selecting a point on the image block as the origin of the image local coordinate system, and constructing the image local coordinate system based on the origin. For example, if the image block of the object is a rectangle, a vertex corresponding to the upper left corner of the image block can be selected as the origin of the image local coordinate system, and the image local coordinate system can be constructed based on the origin. In some embodiments of the present disclosure, the center point of the image block of the object is used as the origin of the image local coordinate system, and the image local coordinate system of the image block is established by using the center point as the origin to establish.

At block S102, 2D projection key points in an image coordinate system corresponding to a plurality of 3D key points on a 3D model of the object are obtained.

In some embodiments of the present disclosure, the 3D model of the object may be pre-established, and stored in a 3D model library for use when obtaining the pose of the object. Alternatively, an identifier may be set for the 3D model of the object to distinguish the 3D models of different objects, and the 3D model of the object may be obtained from the 3D model library according to the identifier. In detail, after the object is detected in the image, the identifier of the object can be determined according to the detected object information, and then the 3D model corresponding to the object can be obtained from the model library according to the identifier.

Alternatively, the object may also be scanned by a device such as a sensor, a 3D scanner, etc., to obtain the 3D model of the object. The 3D model of the object may include a three-dimensional CAD drawing of the object.

Further, after obtaining the 3D model of the object, multiple 3D key points on the 3D model may be obtained. The 3D key points include, but are not limited to, the vertices, the center point, etc. of the 3D model of the object, which are not too limited here. For example, if the object is a table, and the table is composed of a platform and four pillars, the 3D key points of the table may include the vertices on the platform and the vertices of the four pillars.

Alternatively, the key point sampling is performed on the 3D model based on an FPS (farthest point sampling) algorithm to obtain multiple 3D key points on the 3D model of the object. It is understandable that the 3D key points may also be obtained based on other feature extraction algorithms such as NARF (normal aligned radial feature) algorithm, which is not too limited here.

For example, when the key point sampling is performed on the 3D model based on the farthest point sampling algorithm, the first point in an original point set composed of all points on the 3D model may be taken as a key point, and then a point having the largest distance with the key point is selected from the remaining points, and added into a key point set. After that, for each point in the remaining points in the original point set, a distance between the point and each key point in the key point set is calculated and a sum of the distances corresponding to all the key point in the key point set is calculated, and then a point corresponding to the largest sum is selected from the remaining points, and added into the key point set, and so on, until the number of key points in the key point set reaches a preset threshold.

Further, after obtaining the multiple 3D key points on the 3D model of the object, the 2D projection key points corresponding to the multiple 3D key points in the image coordinate system may also be obtained. The image coordinate system is an image coordinate system corresponding to the image, and the 3D key points are in one-to-one correspondence with the 2D projection key points.

At block S103, the 2D projection key points are converted into the local coordinate system to generate corresponding 2D prediction key points.

In some embodiments of the present disclosure, the 2D projection key points are points in the image coordinate system. After the 2D projection key points are obtained, each 2D projection key point may be converted to the image local coordinate system to generate the corresponding 2D prediction key points. It is understandable that the 2D projection key points are in one-to-one correspondence with the 2D prediction key points.

Alternatively, converting each 2D projection key point to the local coordinate system to generate the corresponding 2D prediction key point may include: performing coordinate rotation and/or translation operations on each 2D projection key point according to a rotation angle and/or a translation amount between the image coordinate system and the local coordinate system, to generate the corresponding 2D prediction key points.

At block S104, direction vectors between each pixel point in the image block and each 2D prediction key point are obtained, and a 2D target key point corresponding to each 2D predication key point is obtained based on the direction vectors.

In some embodiments of the present disclosure, a direction vector between a pixel point in the image block and a 2D prediction key point includes but not limited to a direction vector pointing from the pixel point to the 2D prediction key point, and a direction vector pointing from the pixel point to the 2D prediction key point to the pixel point. The length of the direction vector may be set according to the actual situation. For example, the length of the direction vector may be 1, that is, the direction vector is a unit direction vector.

At block S105, a pose of the object is determined according to the 3D key points and the 2D target key points.

Alternatively, the pose of the object may be 6D pose of the object. It should be noted that the 6D pose of the object includes the translation of the object with 3-degree of freedom and the rotation of the object with 3-degrees of freedom.

The 3D key points and the 2D target key points have a one-to-one correspondence, that is, the 3D key points and the 2D target key points are matched into multiple point pairs. And then the pose of the object is estimated based on the multiple point pairs. For example, a PnP (Perspective-N-Point) algorithm is used for pose estimation to obtain the 6D pose of the object.

In conclusion, with the object pose obtaining method according to embodiments of the present disclosure, the image block of the object can be extracted from the image, the 3D key points and the 2D projection key points of the object are obtained, and the 2D target key points are determined based on the direction vectors between each pixel point in the image block and the 2D prediction key points, and then the pose of the object is obtained according to the 3D key points and the 2D target key points. Compared with the solution of obtaining the pose of the object by using the original image in the related art, the image block of the object can be used to obtain the pose of the object. Therefore, in the process of obtaining the pose of the object, influence factors such as light intensity and position occlusion can be considered, and the robustness of attitude estimation is improved.

On the basis of any of the foregoing embodiments, before generating the local coordinate system corresponding to the image block at step S101, a size of the image block may be obtained. If the size of the image block is not a standard size, size adjustment operation may be performed on the image block to adjust the size of the image block to the standard size.

The standard size may be set according to actual situation. For example, when the image block is a rectangle, the standard size of the image block may be set to 128px in height and 128px in width.

Alternatively, performing the size adjustment operation on the image block includes, but is not limited to performing stretching or compression operation on the image block.

Thus, the method can adjust the size of the image block to a standard size, that is, the size of the image block can be unified, which helps to reduce the difficulty of generating the local coordinate system.

Figure 2:
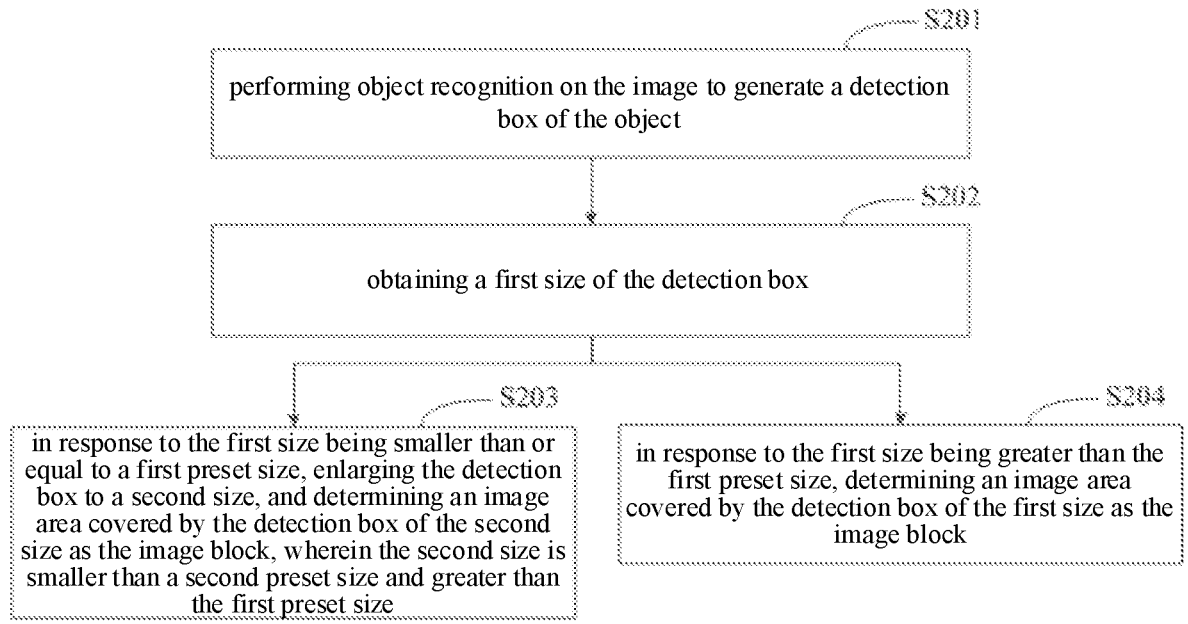
FIG. 2 is a flow chart of extracting an image block of an object from an image in the object pose obtaining method according to an embodiment of the present disclosure.

On the basis of any of the foregoing embodiments, as illustrated in FIG. 2, extracting the image block of the object from the image at block S101 may include the following.

At block S201, object recognition is performed on the image to generate a detection box of the object.

Alternatively, an object recognition algorithm may be used to perform object recognition on the image, so that the object can be positioned in the image to generate the detection box of the object. The object recognition algorithm includes but is not limited to Mask R-CNN (Mask region-convolutional neural network) algorithm, Yolov3 algorithm, SSD (Single Shoot Detectors) algorithm, CenterNet algorithm, etc., which are not limited here.

In some embodiments of the present disclosure, the detection box of the object may completely cover an image area where the object is located. The shape of the detection box includes but is not limited to a circle, a rectangle, etc., which is not limited here.

At block S202, a first size of the detection box is obtained.

It is understandable that, the category of the first size of the detection box varies with the shape of the detection box.

For example, if the detection box is circular, the first size of the detection box includes but is not limited to the radius and diameter of the detection box. If the detection box is rectangular, the first size of the detection box includes but is not limited to the width, the height of the detection box, etc.

For example, if the detection box is a rectangle, the obtained first size of the detection box may include that the height of the detection box is 30 px (Pixel) and the width is 60 px. It should be noted that px is a relative length unit.

At block S203, in response to the first size being smaller than or equal to a first preset size, the detection box is enlarged to a second size, and an image area covered by the detection box of the second size is determined as the image block, the second size being smaller than a second preset size and greater than the first preset size.

In some embodiments of the present disclosure, if the first size is smaller than or equal to the first preset size, it indicates that the size of the current detection box is relative small, and the image area covered by the current detection box is relative small, thus the detection box can be enlarged to the second size, so that the image area covered by the detection box is expanded, and the image area covered by the detection frame of the second size may be intercepted to generate the image block. The second size is smaller than a second preset size and greater than the first preset size.

Alternatively, both the first preset size and the second preset size may be set according to actual conditions, and the second preset size is greater than or equal to the first preset size. For example, the first preset size may be the minimum size allowed by the detection box, and the second preset size may be the maximum size allowed by the detection box.

Alternatively, when the image block has a standard size, the first preset size may be half of the standard size, and the second preset size may be the standard size.

For example, if the image block is rectangular and the standard size of the image block is that the height of the image block is 128px and the width is 128px, the first preset size may be that the height of the image block is 64px and the width is 64px, and the second preset size may that the height of the image block is 128px and the width is 128px.

Alternatively, when the detection box is rectangular, enlarging the size of the detection box to the second size may include stretching the width and height of the detection box at the same stretching ratio to expand the size of the detection box to the second size.

At block S204, in response to the first size being greater than the first preset size, an image area covered by the detection box of the first size is determined as the image block.

In some embodiments of the present disclosure, if the first size is greater than the first preset size, it indicates that the size of the current detection box is relative large, and the image area covered by the current detection box is relative large, thus the image area covered by the detection box with the first size can be directly captured to generate the image block.

Thus, this method can enlarge the size of the detection box to the second size when the first size of the detection box is smaller than the first preset size, which can avoid the situation that the generated image block is too small due to the too small detection box, which helps to improve the robustness of obtaining the pose of the object.

Figure 3:
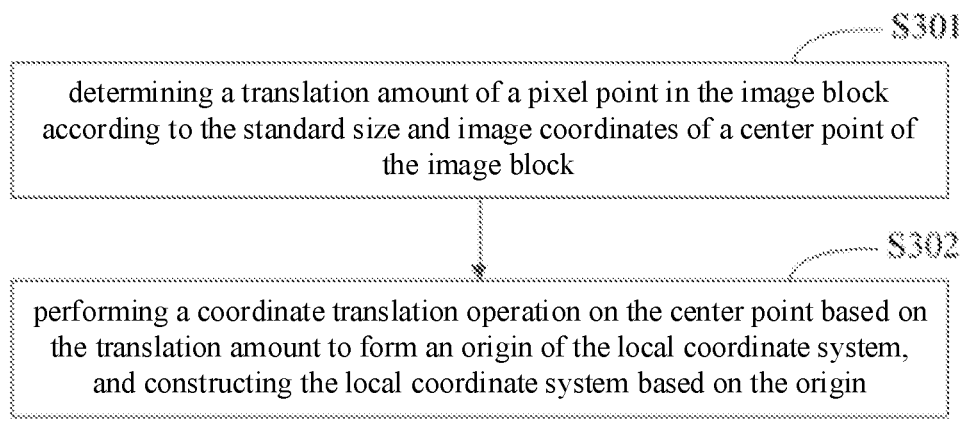
FIG. 3 is a flow chart of generating a local coordinate system corresponding to the image block in the object pose obtaining method according to an embodiment of the present disclosure.

On the basis of any of the foregoing embodiments, as illustrated in FIG. 3, generating the local coordinate system corresponding to the image block at block S101 may include the following.

At block S301, a translation amount of a pixel point in the image block is determined according to the standard size and image coordinates of a center point of the image block.

In some embodiments of the present disclosure, the image coordinates of the center point of the image block are the coordinates of the center point in the image coordinate system.

It is understandable that, when the standard size of the image block and the image coordinates of the center point of the image block are known, the translation amount of the pixel point in the image block can be obtained. The translation amount of the pixel point in the image block may be a two-dimensional vector m, m may be composed of a translation amount xm of the pixel point on the x-axis (horizontal direction), and a translation amount of the pixel point on the y-axis (vertical direction) ym, i.e., m=(xm, ym).

At block S302, a coordinate translation operation is performed on the center point based on the translation amount to form an origin of the local coordinate system, and constructing the local coordinate system based on the origin.

In some embodiments of the present disclosure, performing the coordinate translation operation on the center point based on the translation amount may include determining a point corresponding to the sum of the image coordinates of the center point and the translation amount as the origin of the image local coordinate system.

For example, if the image block is rectangular, the size of the image block before resizing the image block is that the width of the image block is $w_0$ and the height is $h_0$, and the standard size of the image block is that the width of the image block is $1.5w_0$ and the height is $1.5h_0$, the image block can be resized, and both the width and height of the image block may be stretched according to a stretching ratio of 1.5 to adjust the image block to the standard size. If the image coordinates of the center point O of the image block are ($x_0$, $y_0$), and the origin of the image local coordinate system is the vertex at the lower left corner of the image block, the translation amount m of the pixel point in the image block is ($-1.5w_0/2$, $-1.5h_0/2$).

Further, the coordinate translation operation is performed on the center point O according to the translation amount m, and the formed image coordinates of the origin O' of the image local coordinate system may be the sum of the image coordinates ($x_0$, $y_0$) of the center point O and the translation amount m, i.e., ($x_0-1.5w_0/2$, $y_0-1.5h_0/2$), and the image local coordinate system may be constructed based on the re-determined origin O'.

Thus, after the size of the image block is adjusted to the standard size, the method can determine the origin of the image local coordinate system according to the standard size and the image coordinates of the center point of the image block, thereby establishing the image local coordinate system corresponding to the image block.

On the basis of any of the foregoing embodiments, converting each 2D projection key point into the local coordinate system to generate a corresponding 2D prediction key point at block S103 may include the following. The coordinate translation operation is performed on each pixel point on the image block according to the translation amount to generate a pixel point in the local coordinate system. The 2D prediction key points are generated by performing coordinate translation operation on the 2D projection key points.

In some embodiment of the present disclosure, performing the coordinate translation operation on each pixel point on the image block according to the translation amount may include the following. A point corresponding a difference value between the image coordinates of each pixel on the image block and the image coordinates of the origin of the image local coordinate system is determined as a pixel point in the image local coordinate system.

For example, the coordinates in the image coordinate system of pixel point A in the image block are ($x_A$, $y_A$), and the coordinates in the image coordinate system of the origin O' of the image local coordinate system are ($x_0-1.5w_0/2$, $y_0-1.5h_0/2$), then the coordinates in the image local coordinate system of the pixel point A are ($x_A-x_0+1.5w_0/2$, $y_A-y_0+1.5h_0/2$).

Figure 4:
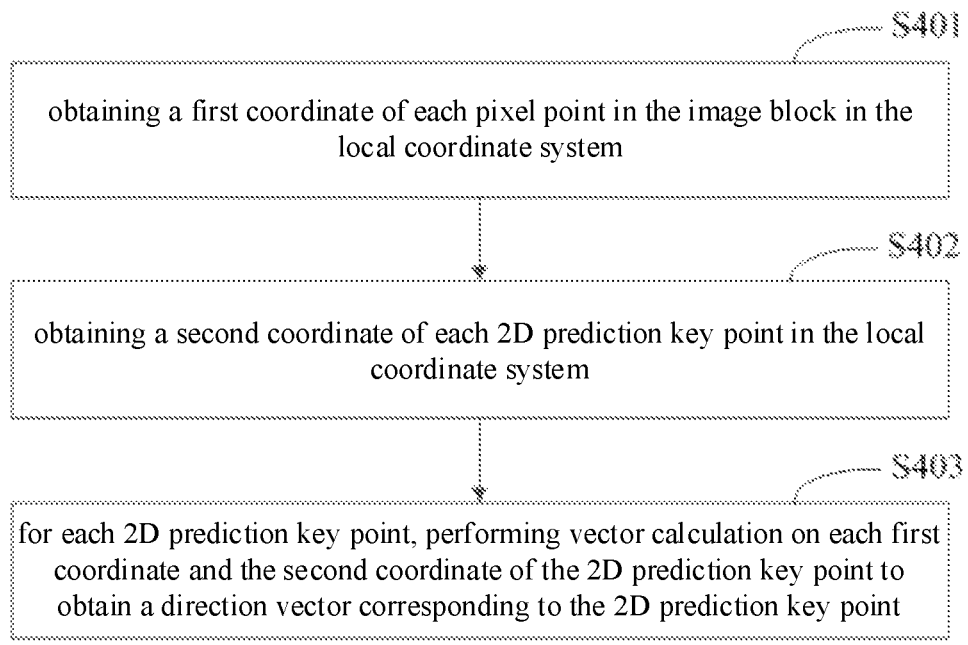
FIG. 4 is a flow chart of obtaining direction vectors between each pixel point in the image block and each 2D prediction key point in the object pose obtaining method according to an embodiment of the present disclosure.

On the basis of any of the foregoing embodiments, as illustrated in FIG. 4, obtaining the direction vectors between each pixel point in the image block and each 2D prediction key point at block S104 may include the following.

At block 401, a first coordinate of each pixel point in the image block in the local coordinate system is obtained.

At block 402, a second coordinate of each 2D prediction key point in the local coordinate system is obtained.

The relevant content of actions at blocks S401-S402 may refer to the above-mentioned embodiments, which is not be repeated here.

At block 403, for each 2D prediction key point, vector calculation is performed on each first coordinate and the second coordinate of the 2D prediction key point to obtain a direction vector corresponding to the 2D prediction key point.

Alternatively, performing the vector calculation on each first coordinate and the second coordinate of the 2D prediction key point may include subtracting the second coordinate of the 2D key point from each first coordinate, or subtracting each first coordinate from the second coordinates of the 2D key point.

For example, if the first coordinate in the image local coordinate system of the pixel point A in the image block is ($x_A'$, $y_A'$), the second coordinate of the 2D prediction key point B in the image local coordinate system is ($x_B'$, $y_B'$), the direction vector C between the pixel point A and the 2D prediction key point B is determined by following equation.

$$C = \left( \frac{x_A' - x_B'}{\sqrt{(x_A' - x_B')^2 + (y_A' - y_B')^2}}, \frac{y_A' - y_B'}{\sqrt{(x_A' - x_B')^2 + (y_A' - y_B')^2}} \right)$$

Thus, the direction vector C is a unit direction vector pointing from the 2D prediction key point B to the pixel point A.

For example, there are M pixel points in an image block and the number of 2D prediction key points is N, then the total number of direction vectors between the M pixel points and the N 2D prediction key points is M*N. Each 2D prediction key point corresponds to M direction vectors. And then, the 2D target key point corresponding to each 2D prediction key point can be determined according to the M direction vectors corresponding to each 2D prediction key point, and N 2D target key points respectively corresponding to the N 2D prediction key points can be obtained.

Thus, with this method, the vector calculation can be performed according to the first coordinate in the image local coordinate system of each pixel point in the image block and the second coordinate of each 2D prediction key point in the image local coordinate system, to obtain the direction vectors corresponding to each 2D prediction key point.

Figure 5:
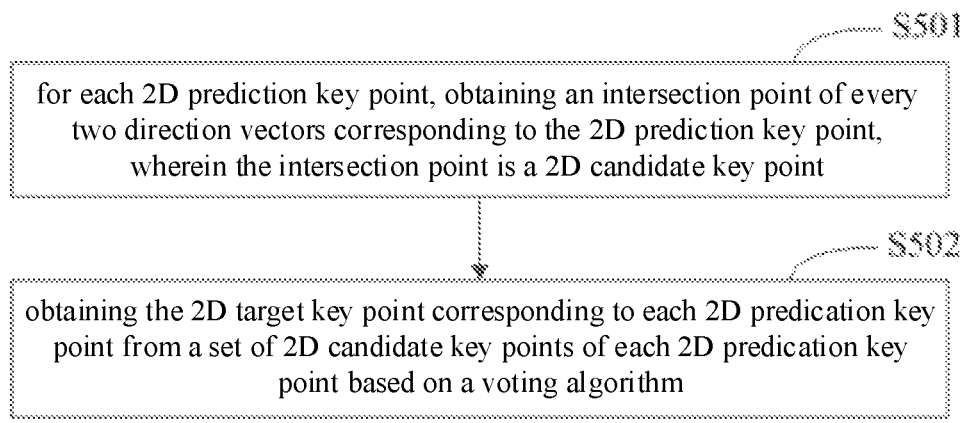
FIG. 5 is a flow chart of obtaining a 2D target key point corresponding to each 2D predication key point based on the direction vectors in the object pose obtaining method according to an embodiment of the present disclosure.

On the basis of any of the foregoing embodiments, as illustrated in FIG. 5, obtaining the 2D target key point corresponding to each 2D predication key point based on the direction vectors at block S104 may include the following.

At block 501, for each 2D prediction key point, an intersection point of every two direction vectors corresponding to the 2D prediction key point is obtained, the intersection point is a 2D candidate key point.

It is understandable that, each 2D prediction key point may correspond to multiple direction vectors. For each 2D prediction key point, the intersection point of every two direction vectors of the 2D prediction key point can be obtained, and the obtained intersection point is used as a 2D candidate key point corresponding to the 2D prediction key point. Thus, each 2D prediction key point may correspond to multiple 2D candidate key points, and then a set of 2D candidate key points corresponding to each 2D prediction key point can be established.

At block 502, the 2D target key point corresponding to each 2D predication key point is obtained from a set of 2D candidate key points of each 2D predication key point based on a voting algorithm.

Alternatively, the voting algorithm may be a RANSAC (Random Sample Consensus) algorithm.

For example, when based on the RANSAC algorithm, for each 2D prediction key point, a score of a 2D candidate key point corresponding to each pixel point on the image block may be calculated, and then the score is compared with a score threshold, if the score is greater than the score threshold, the score of the 2D candidate key point can be increased by a preset value, and finally a point with the highest score is selected from all the 2D candidate key points as the 2D target key point corresponding to the 2D prediction key point.

In this way, with this method, the 2D target key point corresponding to each 2D predication key point is selected from the set of intersection points of direction vectors of each 2D predication key point based on the voting algorithm, so that accuracy of the obtained 2D target key point is improved.

Figure 6:
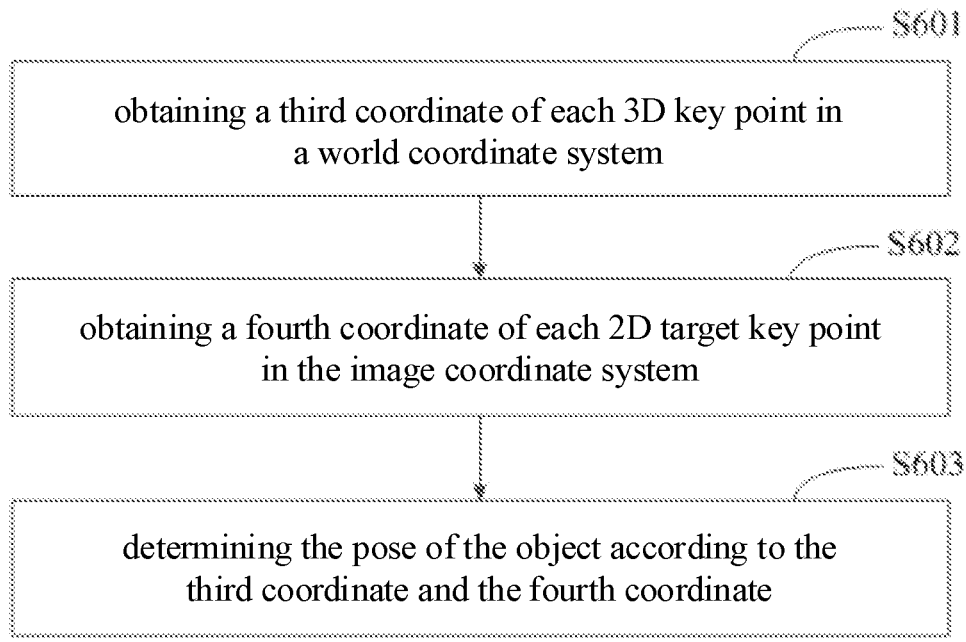
FIG. 6 is a flow chart of determining a pose of the object according to the 3D key points and the 2D target key points in the object pose obtaining method according to an embodiment of the present disclosure.

On the basis of any of the foregoing embodiments, as illustrated in FIG. 6, determining the pose of the object according to the 3D key points and the 2D target key points at block S105 may include the following.

At block 601, a third coordinate of each 3D key point in a world coordinate system is obtained.

At block 602, a fourth coordinate of each 2D target key point in the image coordinate system is obtained.

Alternatively, the coordinates of the 2D target key points in the image local coordinate system may be obtained first, and then coordinate rotation and/or translation operation is performed on the 2D target key points according to a rotation angle and/or a translation amount between the image coordinate system and the image local coordinate system, to obtain the fourth coordinate of the 2D target key points in the image coordinate system.

It is understandable that, the 2D target key point may be an intersection point of two direction vectors corresponding to the 2D prediction key point, then obtaining the fourth coordinate of the 2D target key point in the image coordinate system may include the following. Vector information of two direction vectors forming the 2D target key point is obtained, and the fourth coordinate is obtained according to the vector information.

At block 603, the pose of the object is determined according to the third coordinate and the fourth coordinate.

Alternatively, determining the pose of the object according to the third coordinate and the fourth coordinate may include the following. The third coordinate and the fourth coordinate are put into the PnP algorithm, and the PnP algorithm may match the 3D key points with the 2D target key points. Based on the point pairs composed of the successfully matched 3D key points and 2D key points, combined with a camera internal parameter matrix K, an equation set is established. The pose of the object is obtained by solving the equation set. The PnP algorithm includes but is not limited to P3P, UPnP, EPnP, etc.

Alternatively, determining the pose of the object according to the third coordinate and the fourth coordinate may also include the following. The pose of a camera is determined based on the third coordinate and fourth coordinate, and then the pose of the object is determined based on the pose of the camera. The pose of the camera may be represented by a rotation matrix R and a translation matrix t.

It is understandable that the pose of the object may be obtained based on a transformation relationship between the pose of the camera and the pose of the object.

In a specific implementation, if the pose of the camera is determined to be the rotation matrix R and the translation matrix t according to the third coordinate and the fourth coordinate, the coordinate of the point A on the object in the world coordinate system is $T_A^o$, the coordinate of the point A in the camera coordinate system is $T_A$, the coordinate $T_A$ can be obtained by the following equation.

$$T_A = R * T_A^o + t$$

In this way, the method can obtain the pose of the object according to the third coordinates of the 3D key points in the world coordinate system and the fourth coordinates of the 2D target key points in the image coordinate system.

Based on any of the foregoing embodiments, the image block of the object may be input into a pre-trained target network to obtain the 2D prediction key points corresponding to the multiple 3D key points in the image coordinate system. The target network may be a DNN (Deep Neural Network).

Alternatively, the target network may be trained by using a sample data set corresponding to multiple sample image blocks. The sample data set include, but is not limited to, actual 3D key point data of objects in the sample image blocks, actual 2D prediction key point data, and actual camera pose data.

When training the target network, the sample image blocks may be input to an initial target network to obtain 2D prediction key point data estimated by the initial target network, and then the parameters of the initial target network are adjusted based on the difference between the 2D prediction key point data estimated by the network and the actual 2D prediction key point data, until the difference between the 2D prediction key point data estimated by the network and the actual 2D prediction key point data is less than a preset threshold, then the target network for the last adjustment of the network parameters can be determined as the pre-trained target network.

The actual 2D prediction key point data may be obtained according to the actual 3D key point data and the actual camera pose data.

For example, a coordinate of a 3D key point A in the world coordinate system is $T_A''$, the actual camera pose is the rotation matrix R and the translation matrix t, and a camera internal parameter matrix is K, then a coordinate $T_A$ in the image coordinate system of an actual 2D prediction key point corresponding to the 3D key point A may be determined according to the following formula.

$$T_A = K[R|t]T_A''$$

$$K = \begin{bmatrix} f_x & 0 & c_x \\ 0 & f_y & c_y \\ 0 & 0 & 1 \end{bmatrix}$$

Where, $f_x$ and $f_y$ are the pixel focal lengths of the camera in the x-axis and y-axis directions, respectively, and ($c_x$, $c_y$) is the principal point of the camera.

Thus, the method can estimate the 2D prediction key points corresponding to the multiple 3D key points in the image coordinate system according to the network.

Figure 7:
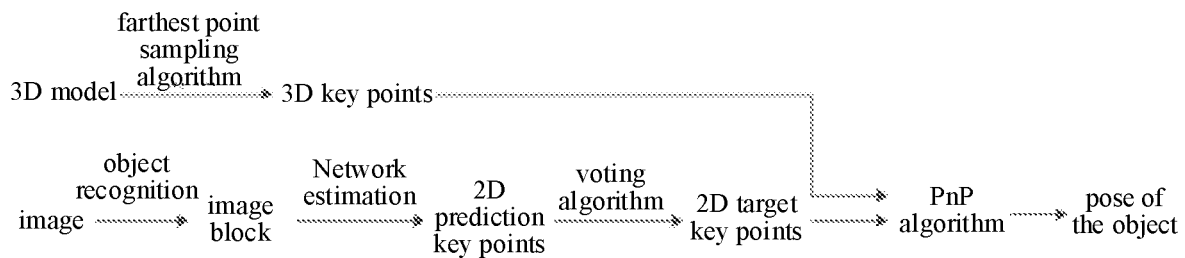
FIG. 7 is a flow chart of an object pose obtaining method according to an embodiment of the present disclosure.

As illustrated in FIG. 7, the 3D key points of the object may be obtained according to the 3D model of the object and the farthest point sampling algorithm. At the same time, object recognition may be performed on the image collected by the camera to extract the image block of the object from the image. After that, the image block may be input into the pre-trained target network to estimate the 2D prediction key points of the object. Then, the corresponding 2D target key points can be obtained from the set of 2D candidate key points of each 2D prediction key point according to the voting algorithm. Finally, the 3D key points and the 2D target key points may be input to the PnP algorithm to obtain the pose of the object.

Figure 8:
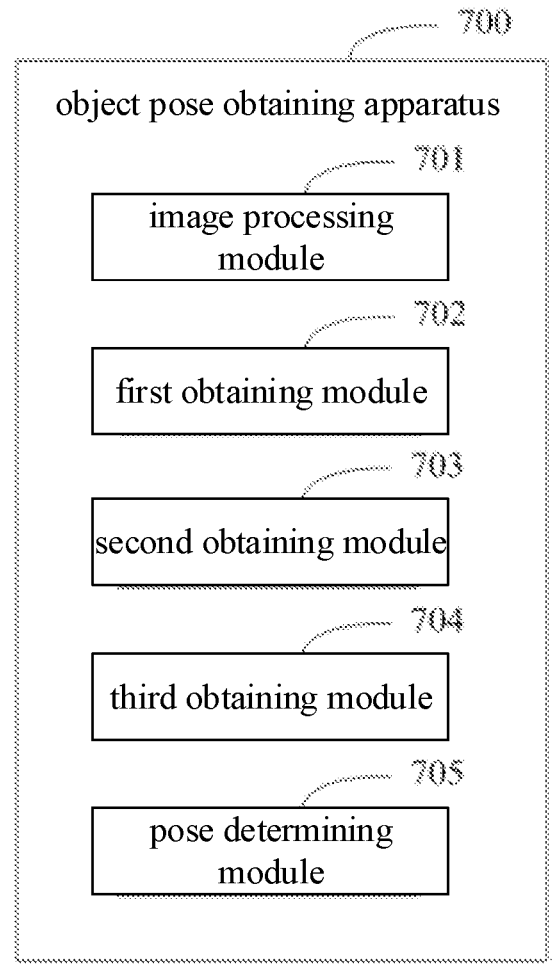
FIG. 8 is a block diagram illustrating an object pose obtaining apparatus according to an embodiment of the present disclosure.

FIG. 8 is a block diagram illustrating an object pose obtaining apparatus according to an embodiment of the present disclosure.

As illustrated in FIG. 8, the object pose obtaining apparatus 700 according to embodiments of the present disclosure includes an image processing module 701, a first obtaining module 702, a second obtaining module 703, a third obtaining module 704, and a pose determining module 705.

The image processing module 701 is configured to extract an image block of an object from an image, and generate a local coordinate system corresponding to the image block.

The first obtaining module 702 is configured to obtain 2D projection key points in an image coordinate system corresponding to a plurality of 3D key points on a 3D model of the object.

The second obtaining module 703 is configured to convert the 2D projection key points into the local coordinate system to generate corresponding 2D prediction key points.

The third obtaining module 704 is configured to obtain direction vectors between each pixel point in the image block and each 2D prediction key point, and obtain a 2D target key point corresponding to each 2D predication key point based on the direction vectors.

The pose determining module 705 is configured to determine a pose of the object according to the 3D key points and the 2D target key points.

In an embodiment of the present disclosure, the image processing module 701 is further configured to: before generating the local coordinate system corresponding to the image block, obtain a size of the image block, and adjust the size of the image block to a standard size when the size of the image block is not the standard size.

In an embodiment of the present disclosure, the image processing module 701 is further configured to: determine a translation amount of a pixel point in the image block according to the standard size and image coordinates of a center point of the image block; and perform a coordinate translation operation on the center point based on the translation amount to form an origin of the local coordinate system, and construct the local coordinate system based on the origin.

In an embodiment of the present disclosure, the second obtaining module 703 is further configured to: perform coordinate translation operation on each pixel point on the image block according to the translation amount to generate a pixel point in the local coordinate system. The 2D prediction key points are generated by performing coordinate translation operation on the 2D projection key points.

In an embodiment of the present disclosure, the third obtaining module 704 includes a first obtaining unit and a second obtaining unit.

The first obtaining unit is configured to obtain a first coordinate of each pixel point in the image block in the local coordinate system, and obtain a second coordinate of each 2D prediction key point in the local coordinate system.

The second obtaining unit is configured to, for each 2D prediction key point, perform vector calculation on each first coordinate and the second coordinate of the 2D prediction key point to obtain a direction vector corresponding to the 2D prediction key point.

In an embodiment of the present disclosure, the third obtaining module 704 further includes a third obtaining unit. The third obtaining unit is configured to: for each 2D prediction key point, obtain an intersection point of every two direction vectors corresponding to the 2D prediction key point, the intersection point being a 2D candidate key point; and a fourth obtaining unit, configured to obtain the 2D target key point corresponding to each 2D predication key point from a set of 2D candidate key points of each 2D predication key point based on a voting algorithm.

In an embodiment of the present disclosure, the pose determining module 705 incudes a fifth obtaining unit and a pose determining unit.

The fifth obtaining unit is configured to obtain a third coordinate of each 3D key point in a world coordinate system, and obtain a fourth coordinate of each 2D target key point in the image coordinate system.

The pose determining unit is configured to determine the pose of the object according to the third coordinate and the fourth coordinate.

In an embodiment of the present disclosure, the fifth obtaining unit 705 is configured to obtain vector information of two direction vectors forming the 2D target key point, and obtain the fourth coordinate according to the vector information.

In an embodiment of the present disclosure, the first obtaining module 702 is configured to, before obtaining the 2D projection key points in the image coordinate system corresponding to the plurality of 3D key points on the 3D model of the object, perform key point sampling on the 3D model based on a farthest point sampling algorithm to obtain the plurality of 3D key points.

In an embodiment of the present disclosure, the image processing module 701 is configured to: perform object recognition on the image to generate a detection box of the object; obtain a first size of the detection box; in response to the first size being smaller than or equal to a first preset size, enlarge the detection box to a second size, and determine an image area covered by the detection box of the second size as the image block, the second size being smaller than a second preset size and greater than the first preset size; and in response to the first size being greater than the first preset size, determine an image area covered by the detection box of the first size as the image block.

In conclusion, with the object pose obtaining apparatus according to embodiments of the present disclosure, the image block of the object can be extracted from the image, the 3D key points and the 2D projection key points of the object are obtained, and the 2D target key points are determined based on the direction vectors between each pixel point in the image block and the 2D prediction key points, and then the pose of the object is obtained according to the 3D key points and the 2D target key points. Compared with the solution of obtaining the pose of the object by using the original image in the related art, the image block of the object can be used to obtain the pose of the object. Therefore, in the process of obtaining the pose of the object, influence factors such as light intensity and position occlusion can be considered, and the robustness of attitude estimation is improved.

According to embodiments of the present disclosure, the present disclosure further provides an electronic device and a computer-readable storage medium.

Figure 9:
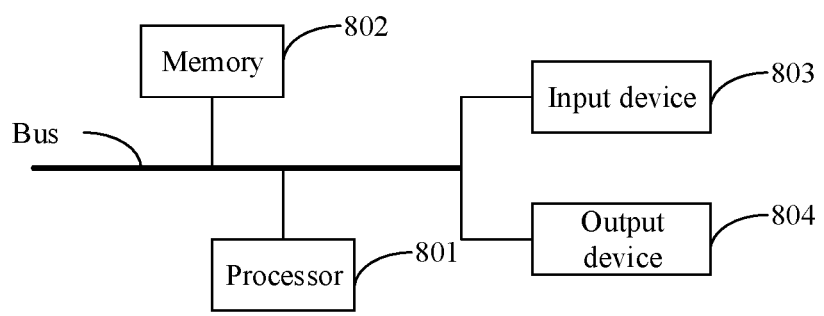
FIG. 9 is a schematic diagram illustrating an electronic device for implementing an object pose obtaining method according to an embodiment of the present disclosure.

FIG. 9 is a schematic diagram illustrating an electronic device for implementing an object pose obtaining method according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as personal digital processing, a cellular phone, a smart phone, a wearable device, and other similar computing devices. The components shown herein, their connections and relationships, and their functions are merely examples, and are not intended to limit the implementation of the present disclosure described and/or required herein.

As illustrated in FIG. 9, the electronic device includes one or more processors 801, a memory 802, and interfaces for connecting various components. The interfaces include a high-speed interface and a low-speed interface. The various components are connected to each other using different buses, and can be installed on a common mainboard or installed in other ways as needed. The processor 801 may process instructions executed in the electronic device, including instructions stored in or on the memory to display graphical information of the GUI on an external input/output device (such as a display device coupled to an interface). In other embodiments, if necessary, multiple processors and/or multiple buses can be used together with multiple memories. Similarly, multiple electronic devices can be connected, and each device provides some necessary operations (for example, as a server array, a group of blade servers, or a multi-processor system). In FIG. 9, one processor 801 is taken as an example.

The memory 802 is the non-transitory computer-readable storage medium provided by the present disclosure. The memory stores instructions executable by the at least one processor, so that the at least one processor executes the object pose obtaining method provided in the present disclosure. The non-transitory computer-readable storage medium of the present disclosure stores computer instructions, and the computer instructions are used to cause a computer to execute the object pose obtaining method provided by the present disclosure.

As a non-transitory computer-readable storage medium, the memory 802 can be used to store non-transitory software programs, non-transitory computer-executable programs and modules, such as program instructions/modules (for example, the image processing module 701, the first obtaining module 702, the second obtaining module 703, the third obtaining module 704, and the pose determining module 705 shown in FIG. 8) corresponding to the object pose obtaining method in the embodiments of the present disclosure. The processor 801 executes various functional applications and data processing of the server by running the non-transitory software programs, instructions, and modules stored in the memory 802, that is, realizes the object pose obtaining method in the foregoing method embodiments.

The memory 802 may also include a program storage area and a data storage area. The program storage area may store an operating system and an application program required by at least one function. The data storage area may store data created according to the use of the electronic device for the medical data verification method, etc. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to an electronic device for implementing the object pose obtaining method. Examples of the aforementioned networks include, but are not limited to, the Internet, intranets, local area networks, mobile communication networks, and combinations thereof.

The electronic device for implementing the object pose obtaining method may further include an input device 803 and an output device 804. The processor 801, the memory 802, the input device 803, and the output device 804 may be connected by a bus or in other ways. In FIG. 9, the connection via a bus is taken as an example.

The input device 803 can receive input numeric or character information, and generate key signal input related to the user settings and function control of the electronic device for the object pose obtaining method, such as input devices like a touch screen, a keypad, a mouse, a trackpad, a touchpad, a pointing stick, one or more mouse buttons, a trackball, a joystick, etc. The output device 804 may include a display device, an auxiliary lighting device (for example, a light-emitting diode (LED)), a tactile feedback device (for example, a vibration motor), and the like. The display device may include, but is not limited to, a liquid crystal display (LCD), a LED display, and a plasma display. In some embodiments, the display device may be a touch screen.

Various implementations of the systems and technologies described herein can be implemented in a digital electronic circuit system, an integrated circuit system, an application-specific ASIC (application-specific integrated circuit), computer hardware, firmware, software, and/or combinations thereof. These various embodiments may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input device, and at least one output device, and transmit the data and instructions to the storage system, the at least one input device, and the at least one output device.

These computing programs (also called programs, software, software applications, or codes) include machine instructions for the programmable processors, and high-level processes and/or object-oriented programming languages, and/or assembly/machine language may be utilized to implement these calculation programs. As used herein, the terms "machine-readable medium" and "computer-readable medium" refer to any computer program product, apparatus, and/or device used to provide machine instructions and/or data to the programmable processor, such as, magnetic disks, optical disks, memory, programmable logic devices (PLD), including machine-readable media that receive machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a Cathode Ray Tube (CRT) or Liquid Crystal Display (LCD) monitor) for displaying information to the user; and a keyboard and pointing device (such as a mouse or trackball) through which the user can provide input into a computer. Other kinds of apparatuses may also be used to provide interaction with the user. For example, the feedback provided to the user may be any form of sensory feedback (for example, visual feedback, auditory feedback, or haptic feedback); and input from the user may be received in any form (including acoustic input, voice input, or tactile input).

The systems and technologies described herein can be implemented in a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including any combination of such background components, middleware components, and front-end components. The components of the system may be interconnected by any form or medium of digital data communication (such as, a communication network). Examples of communication networks include: a local area network (LAN), a wide area network (WAN), and the Internet.

The computer system may include clients and servers. The client and server are generally remote from each other and typically interact through a communication network. The client-server relation is generated by computer programs running on the respective computers and having a client-server relation with each other. The server may be a cloud server, also known as a cloud computing server or a cloud host, which is a host product in the cloud computing service system, to solve defects of difficult management and weak business scalability in the traditional physical host and VPS (Virtual Private Server) service.

With the technical solution according to embodiments of the present disclosure, the image block of the object can be extracted from the image, the 3D key points and the 2D projection key points of the object are obtained, and the 2D target key points are determined based on the direction vectors between each pixel point in the image block and the 2D prediction key points, and then the pose of the object is obtained according to the 3D key points and the 2D target key points. Compared with the solution of obtaining the pose of the object by using the original image in the related art, the image block of the object can be used to obtain the pose of the object. Therefore, in the process of obtaining the pose of the object, influence factors such as light intensity and position occlusion can be considered, and the robustness of attitude estimation is improved.

It should be understood that the various forms of flows shown above can be used to reorder, add, or delete steps. For example, the steps disclosed in the present application can be executed in parallel, sequentially, or in different orders. As long as the desired results of the technical solutions disclosed in the present disclosure can be achieved, there is no limitation herein.

The foregoing specific embodiments do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of the present disclosure shall be included in the protection scope of the present disclosure.

What is claimed is:

1. An object pose obtaining method, comprising:
extracting an image block of an object from an image, and generating a local coordinate system corresponding to the image block;
obtaining 2D projection key points in an image coordinate system corresponding to a plurality of 3D key points on a 3D model of the object;
converting the 2D projection key points into the local coordinate system to generate corresponding 2D prediction key points;
obtaining direction vectors between each pixel point in the image block and each 2D prediction key point, and obtaining a 2D target key point corresponding to each 2D prediction key point based on the direction vectors; and
determining a pose of the object according to the 3D key points and the 2D target key points.

2. The method according to claim 1, before generating the local coordinate system corresponding to the image block, further comprising:
obtaining a size of the image block, and adjusting the size of the image block to a standard size when the size of the image block is not the standard size.

3. The method according to claim 2, wherein generating the local coordinate system corresponding to the image block comprises:
determining a translation amount of a pixel point in the image block according to the standard size and image coordinates of a center point of the image block; and
performing a coordinate translation operation on the center point based on the translation amount to form an origin of the local coordinate system, and constructing the local coordinate system based on the origin.

4. The method according to claim 3, wherein converting the 2D projection key points into the local coordinate system to generate corresponding 2D prediction key points comprises:
performing coordinate translation operation on each pixel point on the image block according to the translation amount to generate a pixel point in the local coordinate system, wherein, the 2D prediction key points are generated by performing coordinate translation operation on the 2D projection key points.

5. The method according to claim 1, wherein obtaining the direction vectors between each pixel point in the image block and each 2D prediction key point comprises:
obtaining a first coordinate of each pixel point in the image block in the local coordinate system;
obtaining a second coordinate of each 2D prediction key point in the local coordinate system; and
for each 2D prediction key point, performing vector calculation on each first coordinate and the second coordinate of the 2D prediction key point to obtain a direction vector corresponding to the 2D prediction key point.

6. The method according to claim 5, wherein obtaining the 2D target key point corresponding to each 2D prediction key point based on the direction vectors comprises:
for each 2D prediction key point, obtaining an intersection point of every two direction vectors corresponding to the 2D prediction key point, wherein the intersection point is a 2D candidate key point; and
obtaining the 2D target key point corresponding to each 2D predication key point from a set of 2D candidate key points of each 2D prediction key point based on a voting algorithm.

7. The method according to claim 6, wherein determining the pose of the object according to the 3D key points and the 2D target key points comprises:
obtaining a third coordinate of each 3D key point in a world coordinate system;
obtaining a fourth coordinate of each 2D target key point in the image coordinate system; and
determining the pose of the object according to the third coordinate and the fourth coordinate.

8. The method according to claim 7, wherein obtaining the fourth coordinate of each 2D target key point in the image coordinate system comprises:
obtaining vector information of two direction vectors forming the 2D target key point, and obtaining the fourth coordinate according to the vector information.

9. The method according to claim 1, before obtaining the 2D projection key points in the image coordinate system corresponding to the plurality of 3D key points on the 3D model of the object, further comprising:
performing key point sampling on the 3D model based on a farthest point sampling algorithm to obtain the plurality of 3D key points.

10. The method according to claim 1, wherein extracting the image block of the object from the image comprises:
performing object recognition on the image to generate a detection box of the object;
obtaining a first size of the detection box;
in response to the first size being smaller than or equal to a first preset size, enlarging the detection box to a second size, and determining an image area covered by the detection box of the second size as the image block, wherein the second size is smaller than a second preset size and greater than the first preset size; and
in response to the first size being greater than the first preset size, determining an image area covered by the detection box of the first size as the image block.

11. An electronic device, comprising:
at least one processor; and
a memory communicatively couple to the at least one processor;
wherein, the memory has instructions executable by the at least one processor stored thereon that, when executed by the at least one processor, cause the at least one processor to perform an object pose obtaining method, the method comprising:
extracting an image block of an object from an image, and generating a local coordinate system corresponding to the image block;
obtaining 2D projection key points in an image coordinate system corresponding to a plurality of 3D key points on a 3D model of the object;
converting the 2D projection key points into the local coordinate system to generate corresponding 2D prediction key points;
obtaining direction vectors between each pixel point in the image block and each 2D prediction key point, and obtaining a 2D target key point corresponding to each 2D prediction key point based on the direction vectors; and
determining a pose of the object according to the 3D key points and the 2D target key points.

12. The electronic device according to claim 11, wherein, before generating the local coordinate system corresponding to the image block, the method further comprises:
obtaining a size of the image block, and adjusting the size of the image block to a standard size when the size of the image block is not the standard size.

13. The electronic device according to claim 12, wherein generating the local coordinate system corresponding to the image block comprises:
determining a translation amount of a pixel point in the image block according to the standard size and image coordinates of a center point of the image block; and
performing a coordinate translation operation on the center point based on the translation amount to form an origin of the local coordinate system, and constructing the local coordinate system based on the origin.

14. The electronic device according to claim 13, wherein converting the 2D projection key points into the local coordinate system to generate corresponding 2D prediction key points comprises:
performing coordinate translation operation on each pixel point on the image block according to the translation amount to generate a pixel point in the local coordinate system, wherein, the 2D prediction key points are generated by performing coordinate translation operation on the 2D projection key points.

15. The electronic device according to claim 11, wherein obtaining the direction vectors between each pixel point in the image block and each 2D prediction key point comprises:
obtaining a first coordinate of each pixel point in the image block in the local coordinate system;
obtaining a second coordinate of each 2D prediction key point in the local coordinate system; and
for each 2D prediction key point, performing vector calculation on each first coordinate and the second coordinate of the 2D prediction key point to obtain a direction vector corresponding to the 2D prediction key point.

16. The electronic device according to claim 15, wherein obtaining the 2D target key point corresponding to each 2D predication key point based on the direction vectors comprises:
for each 2D prediction key point, obtaining an intersection point of every two direction vectors corresponding to the 2D prediction key point, wherein the intersection point is a 2D candidate key point; and
obtaining the 2D target key point corresponding to each 2D prediction key point from a set of 2D candidate key points of each 2D predication key point based on a voting algorithm.

17. The electronic device according to claim 16, wherein determining the pose of the object according to the 3D key points and the 2D target key points comprises:
obtaining a third coordinate of each 3D key point in a world coordinate system;

obtaining a fourth coordinate of each 2D target key point in the image coordinate system; and determining the pose of the object according to the third coordinate and the fourth coordinate.

18. The electronic device according to claim 17, wherein obtaining the fourth coordinate of each 2D target key point in the image coordinate system comprises:

obtaining vector information of two direction vectors forming the 2D target key point, and obtaining the fourth coordinate according to the vector information.

19. The electronic device according to claim 11, wherein before obtaining the 2D projection key points in the image coordinate system corresponding to the plurality of 3D key points on the 3D model of the object, the method further comprises:

performing key point sampling on the 3D model based on a farthest point sampling algorithm to obtain the plurality of 3D key points.

20. A non-transitory computer-readable storage medium having computer instructions stored thereon, wherein the computer instructions are configured to cause a computer to perform an object pose obtaining method, the method comprising:

extracting an image block of an object from an image, and generating a local coordinate system corresponding to the image block;

obtaining 2D projection key points in an image coordinate system corresponding to a plurality of 3D key points on a 3D model of the object;

converting the 2D projection key points into the local coordinate system to generate corresponding 2D prediction key points;

obtaining direction vectors between each pixel point in the image block and each 2D prediction key point, and obtaining a 2D target key point corresponding to each 2D prediction key point based on the direction vectors; and determining a pose of the object according to the 3D key points and the 2D target key points.

\* \* \* \* \*